United States Patent
Smith

(10) Patent No.: US 8,181,600 B2
(45) Date of Patent: May 22, 2012

(54) BALE FEEDER AND TRANSPORT DEVICE

(76) Inventor: Kim Smith, Cambridge, MN (US)

( * ) Notice: Subject to any disclaimer, the term of this patent is extended or adjusted under 35 U.S.C. 154(b) by 669 days.

(21) Appl. No.: 12/343,960

(22) Filed: Dec. 24, 2008

(65) Prior Publication Data

US 2009/0169340 A1    Jul. 2, 2009

Related U.S. Application Data

(60) Provisional application No. 61/017,417, filed on Dec. 28, 2007.

(51) Int. Cl.
*A01K 5/00* (2006.01)

(52) U.S. Cl. .......... 119/60; 119/58; 119/61.1; 414/24.5

(58) Field of Classification Search ............ 119/58, 119/59, 60, 61.1, 63, 61.2; 414/24.5; *A01K 5/00, A01K 5/01, 1/10*
See application file for complete search history.

(56) References Cited

U.S. PATENT DOCUMENTS

| | | | | |
|---|---|---|---|---|
| 3,995,594 A | * | 12/1976 | Rose | 119/60 |
| 4,044,907 A | * | 8/1977 | Craft | 414/24.5 |
| 5,000,122 A | | 3/1991 | Smith | |
| 5,030,053 A | * | 7/1991 | Wickizer | 414/24.5 |
| 5,311,840 A | * | 5/1994 | Rumbaugh | 119/60 |
| 5,496,145 A | | 3/1996 | Monin | |
| D472,681 S | | 4/2003 | Melius | |
| 6,789,504 B1 | | 9/2004 | O'Neill | |
| D548,896 S | * | 8/2007 | Stewart | D30/131 |
| 2006/0070580 A1 | * | 4/2006 | Klene | 119/60 |
| 2006/0182523 A1 | | 8/2006 | Burkhardt | |

OTHER PUBLICATIONS

Elk Equipment: Off-Ground Round Bale Feeder, JDL Longhorn Internet Site. http://www.usahorseclassifieds.com/photos/6631.jpg, Nov. 17, 2004.
Regency Steel, http://www.regencysteel.com.au/pics/balefeeders.htm, Nov. 6, 2007.
Hay Feeders, http://www.finch-engineering.com.au/Hay%20Feeders.htm, Nov. 6, 2007.

* cited by examiner

*Primary Examiner* — Rob Swiatek
*Assistant Examiner* — Kathleen Iwasaki
(74) *Attorney, Agent, or Firm* — IPLM Group, P.A.

(57) ABSTRACT

A round bale sled that is a combination round bale feeder and transport device. In one embodiment, the bale sled includes a bale holding portion and a base. The bale holding portion is configured to hold a round bale. The base is coupled to the bale holding portion. The base is configured to allow the bale sled to be pulled in a select direction. Moreover, the base is further configured to allow for a pivot loading of the round bale in the bale holding portion.

15 Claims, 3 Drawing Sheets

BALE FEEDER AND TRANSPORT DEVICE

CROSS REFERENCE TO RELATED APPLICATIONS

The present application claims priority to Provisional Patent Application No. 61/017,417, having the same title herewith filed on Dec. 28, 2007 which is incorporated in its entirety herein.

BACKGROUND

It has become common practice in farming to harvest hay for feed in round bales. Although, these bales have advantages such as they provide a large amount of hay they are difficult to move. For example, these bales may weigh 1500 lbs or more and require heavy equipment to move.

For the reasons stated above and for other reasons stated below which will become apparent to those skilled in the art upon reading and understanding the present specification, there is a need in the art for and effective an efficient means to handle large round bales.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a bale sled is provided. The bale sled includes a bale holding portion and a base. The bale holding portion is configured to hold a round bale. The base is coupled to the bale holding portion. The base is configured to allow the bale sled to be pulled in a select direction. Moreover, the base is further configured to allow for a pivot loading of the round bale in the bale holding portion.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide a combination bale feeder and transport device (bale sled). In embodiments a round bale can be moved from the hay field it was harvested in to a feeding location without the expense or need of heavy moving farm equipment. For example, embodiments of the bale sled can be pulled by an average size vehicle (i.e. truck, SUV, automobile, bobcat etc.). Embodiments are easily cleaned and in some embodiments the bale sleds can be stacked for storage or transportation. Embodiments are relatively light weight and allow for easy transportation. Moreover, some embodiments can be transported in the bed of an average size pickup truck.

Figure 1A:
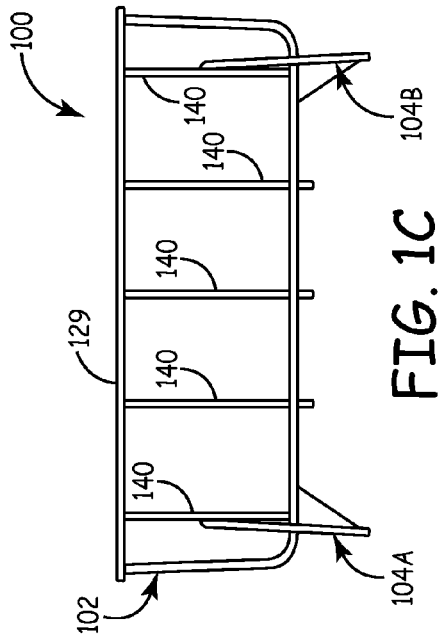
FIG. 1A is a first side view of a round bale sled of one embodiment of the present invention.
Figure 1D:
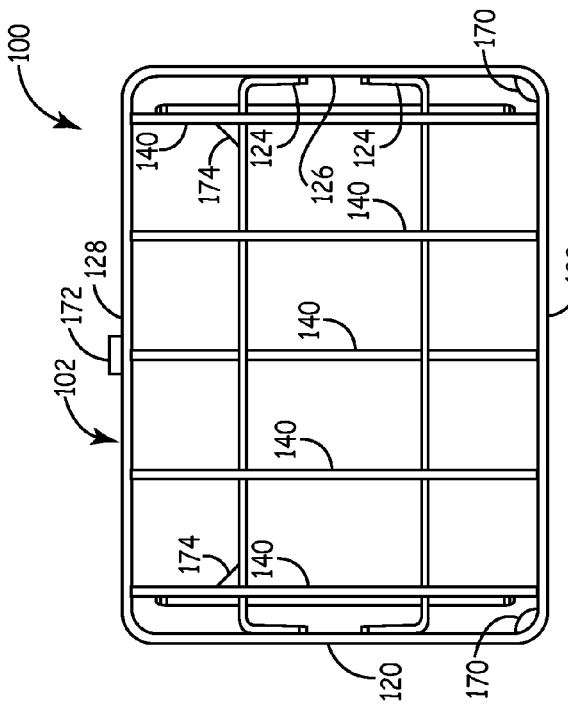
FIG. 1D is a top side view of the round bale sled of the embodiment of FIGS. 1A, 1B and 1C.
Figure 1C:
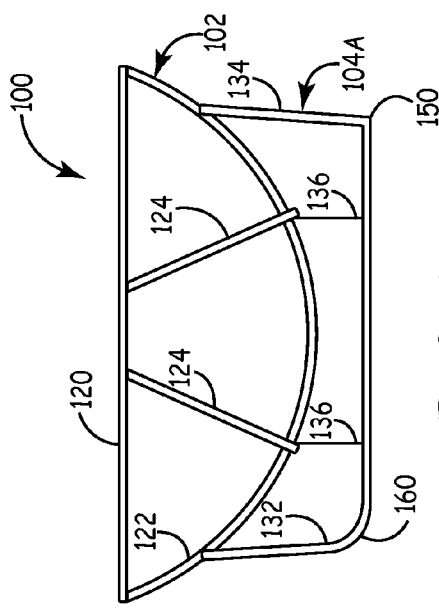
FIG. 1C is a front view of the round bale sled of the embodiment of FIGS. 1A and 1B.
Figure 1B:
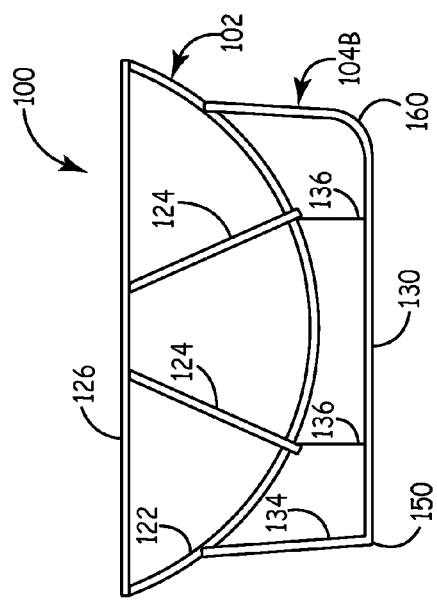
FIG. 1B is a second side view of the round bale sled of the embodiment of FIG. 1A.

Referring to FIGS. 1A through 1D illustrations of an embodiment of a bale sled 100 are provided. In particular, FIG. 1A illustrates a first side view of the bale sled 100, FIG. 1B illustrates a second side view of the bale sled 100, FIG. 1C illustrates a front view of a bale sled 100 and FIG. 1D illustrates a top view of the bale sled 100. As illustrated, the bale sled 100 includes a bale holding portion 102 and a base made of a pair of transports rails 104A and 104B in this embodiment. The bale holding portion 102 holds a round bale. The bale holding portion 102 includes a first retaining rail 120, a second retaining rail 126, a rear retaining rail 128 and a forward retaining rail 129 that define an outer parameter of the bale holding portion 102 in which round bales are retained within. The bale holding portion 102 further includes a plurality of bale supports 140 that are coupled between the rear retaining rail 128 and the forward retaining rail 129. The bale supports 140 are semi-circle in shape and support a round bale when in the bale sled 100. In the embodiment of FIGS. 1A through 1D, U-shaped side supports 124 extend between the first side rail 120 to the second side rail 126. Each U-shaped support 124 is coupled to each of the bale supports 140.

The transport rails 104A and 104B (the base) each include a bottom portion 130, a first portion 132 and a second portion 134. The bottom portion 130 engages a ground surface when the bale sled 100 is in an upright position. The first portion 132 extends between a bale support 140 of the bale holding portion 102 and the bottom portion 130. The second portion 134 extends between the bale support 104 of the bale holding portion 102 and another end of the bottom portion 130. A connection between the first portion 132 and the bottom portion 130 of each transport rail 104A and 104B includes a rounded corner 160. The rounded corner 160 has a curvature that prevents each transport rail 104A and 104B from digging into a ground surface when the bale sled is pulled. This prevents the bale sled 100 from tipping when being pulled to a desired location. A connection between the second portion 134 and the bottom portion 103 of each transport rail 104A and 104B includes a sharp corner 150. The sharp corner 150 digs into the surface of the ground and is used as a pivot point to tip the bale sled 100 upright after a bale has been strapped into the bale holding portion 102. This is further described in relation to FIGS. 2A through 2F below. The length of the second portion 134 is selected to enhance the tipping of the bale sled 100 in an upright position. As further illustrated, base supports 136 are further attached between the bottom portion 130 and select bale supports 140.

Some embodiments include attachment points. For example, referring to FIG. 1D, strap attachment rods (or attachment points) 170 and 172 are illustrated. These attachment points 170 and 172 are coupled to the rails 120, 126, 128 and 129 and provide points where a loading strap 202 can be connected to secure a bale 200 within the bale holding portion 102 of the bale sled 100. Attachment point 172 can also be used to connect a pulling strap 204 as discussed below in regards to FIGS. 2C through 2E. Also illustrated in FIG. 1D is attaching rods (or attaching points) 174. Attaching points 174 are used to attach a tow bar 206 to the bale sled in one embodiment. This is also discussed below in regards to FIG. 2F. Each attaching point 174 is coupled between a select side support 124 and a select bale support 140.

FIGS. 2A through 2H illustrate how the bale sled 100 is used in one embodiment.

Figure 2A:
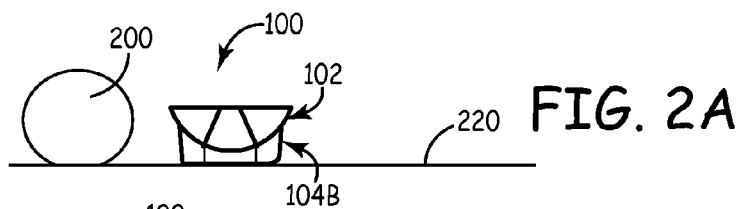
FIGS. 2A through 2H illustrate the use of a round bale sled of the embodiment of FIGS. 1A through 1D.
Figure 2B:
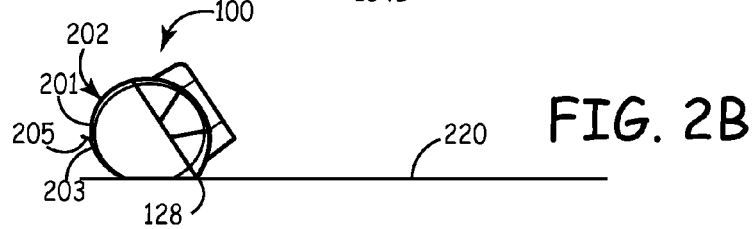

FIG. 2A illustrates a round bale 200 and the bale sled 100 in an upright position. In use, a user simply places the bale holding portion 102 over the bale 202 as illustrated in FIG. 2B. As FIG. 2B illustrates, the rear retaining rail 128 is positioned against the ground 220. A loading strap 202 is then placed around the bale 202 and connected to the bale holding portion 102 of the bale sled 202. The loading strap 202 secures the bale 200 in the bale holding portion 102. In one embodiment, the loading strap 202 includes a first portion 201 and a second portion 203. The first portion includes a hook 205 and the second portion 203 includes a loop that fits around the hook. Further, in an embodiment, the first portion 201 of the loading strap 202 is coupled to attachment point 172 and the second portion 203 of the loading strap 202 is coupled to one of the attachment points 170. In another embodiment the loading strap 202 is simply coupled across two of the rails 120, 126, 128 and 129 to secure the bale 200 in the bale holding portion 102.

Figure 2C:
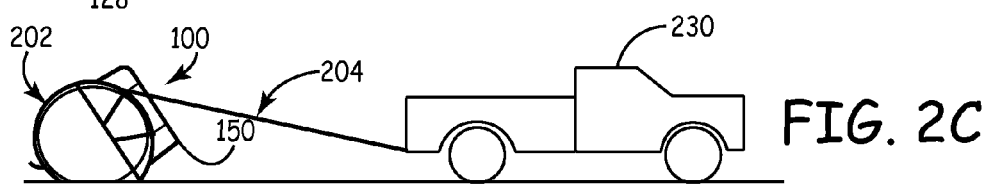
Figure 2D:
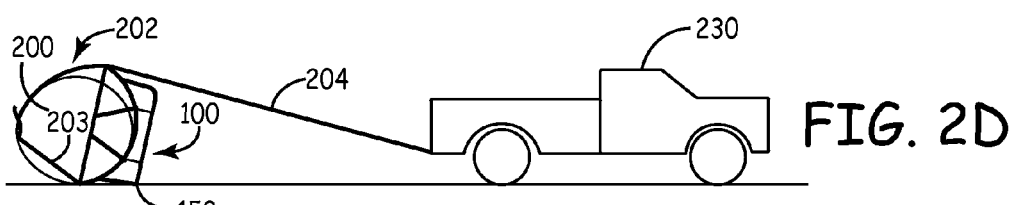
Figure 2E:
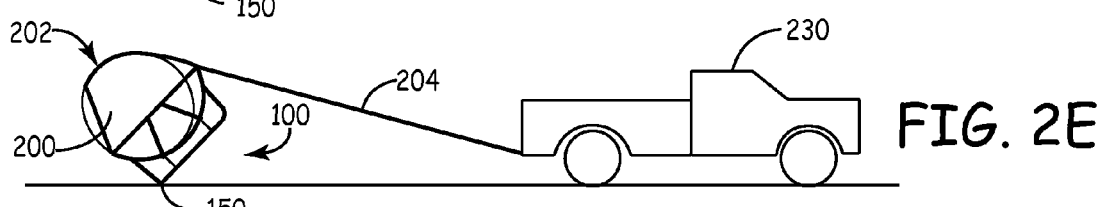
Figure 2F:
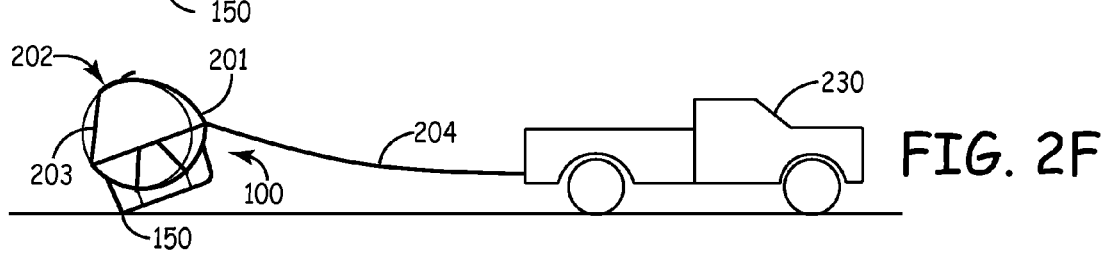
Figure 2G:
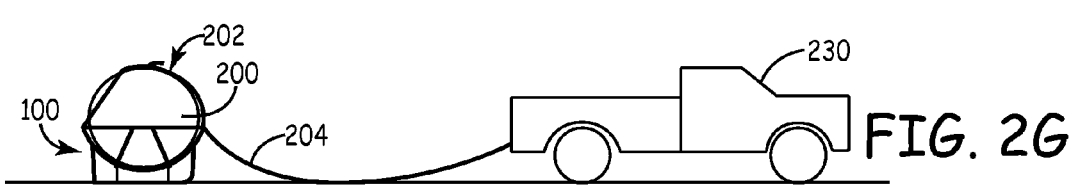
Figure 2H:
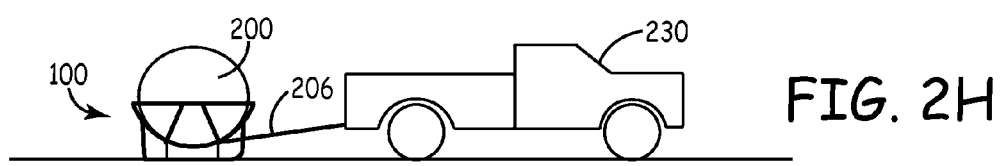

A pulling strap 204 is then attached to the bale sled 100 as illustrated in FIG. 2C. In one embodiment the pulling strap is attached to attaching point 172. In other embodiments, the pulling strap 204 is merely coupled to the bale sled 100 in a location that provides a desired rotation force. A force on the pulling strap 204, provided by vehicle 230 in FIGS. 2C through 2F, rotates the bale sled 100 so the sharp corner 150 of each transport rail 104A and 104b engages the ground 220. As FIGS. 2D and 2G illustrate, the pulling force on the pulling strap 204 pivots the bale sled 100 on the sharp corners 150 of the transport rails 104A and 104B to the upright position illustrated in FIG. 2G. Hence, embodiments allow for the easy and efficient pivot loading of the bale 200 in the bale sled 100. Once, the bale sled 100 has been placed in the upright position with the bale 200 in the bale holding portion 102, a tow bar 206 can be attached as illustrated in FIG. 2H. The tow bar 206 can be used by the vehicle 230 to pull the bale sled 100 to a desired location. The tow bar can be coupled to the attaching points 174 as discussed above. The loading strap 202 can be removed from around the bale 200 when the bale sled 100 is pivoted in the upright position or when the bale sled 100 has arrived in the desired location.

Figure 3A:
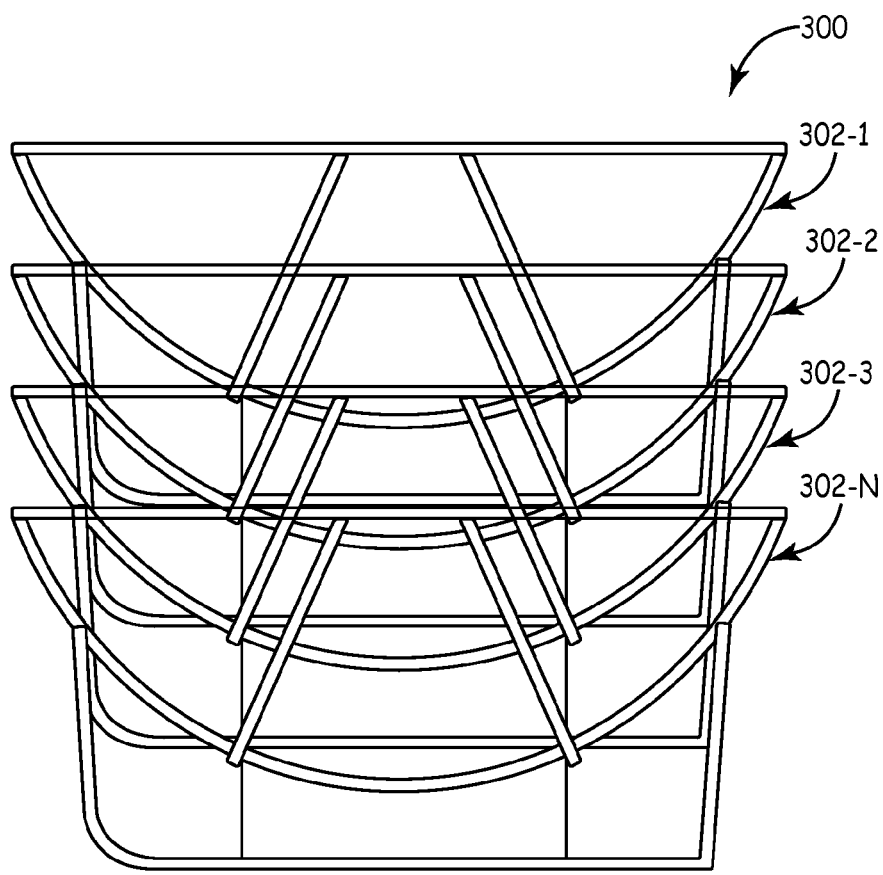
FIGS. 3A through 3B illustrate the stacking of round bale sleds of embodiments of the present invention.
Figure 3B:
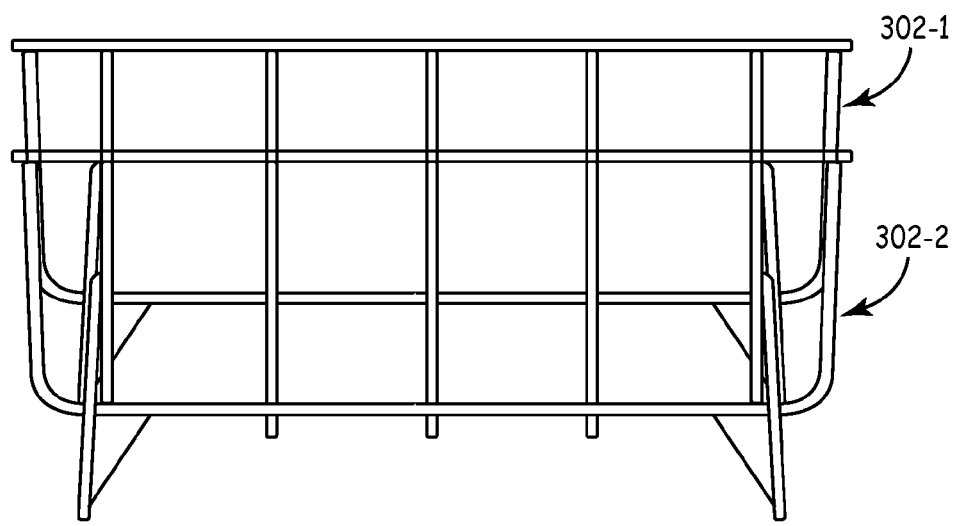

Referring to FIG. 3A a side view illustration of a stack 300 of bale sleds 302-1 through 302-N (302 (1-N)) of one embodiment is illustrated. As FIG. 3A illustrates, in one embodiment, the bale sleds 302 (1-N) are designed so they can be stacked within each other. This feature allows for ease of transporting multiple bale sleds and reduced storage space requirements for unused bale sleds 302 (1-N). The front view of FIG. 3B further provides an illustration on of how the stack 300 of bale sleds 302-1 and 302-2 fit together. As FIGS. 1A through 3B illustrate, in embodiments the retaining rails 120, 126, 128 and 129 extend out beyond all portions of the base 104A and 104B when the bale sled 100 or 302 is in the upright position. This design helps prevent animals feeding on the hay in the bale holder portion 102 from stepping into and over the base 104A and 104B since the animals upper body will be held back by the retaining rails 120, 126, 128 and 129. This helps prevent the animal from being entangled with the bale sled 100. Moreover, in embodiments, the spacing of bale supports 140 and side bale portions 124 are selected to prevent the possibility of animals getting their heads caught between. In one embodiment, square tubular steel is used to form the bale sled 100. In other embodiments, different shape and different material having sufficient rigid characteristics are used. Hence, embodiments are not limited to square tubular steel. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A bale sled comprising:
   a bale holding portion configured to hold a round bale, the bale holding portion having a width and a length, the width of the bale holding portion extending between opposing ends of at least one semi-circular bale support of a plurality of semi-circular bale supports that are conformed to the shape of a portion of the round bale; and
   a base coupled to the bale holding portion, the base configured and arranged to space the bale holding portion from a ground the bale sled is resting on when the bale sled is in an upright position, the base including at least first and second spaced transport rails, each transport rail including,
   a first rail portion,
   a second rail portion, and
   a bottom rail portion, the bottom rail portion configured to engage the ground, the bottom rail portion further having a length defined between a first end and second end, the length of the bottom rail portion extending along a direction of the width of the bale holding portion, the first rail portion extending between the bale holding portion and the first end of the bottom rail portion, a rounded corner formed with the first rail portion and the first end of the bottom rail portion to prevent the transport rail from digging into the ground when the bale sled is in the upright position and the bale sled is pulled in a select direction, the second rail portion extending between the bale holding portion and the second end of the bottom rail portion, a sharp corner formed with the second rail portion and the first second end of the bottom rail portion to cause the transport rail to dig into the ground to pivot the bale sled into the upright position when the bale sled is pulled in the select direction.

2. The bale sled of claim 1, the base further comprising:
   the length of the bottom rail portion being less than the width of the bale holding portion.

3. The bale sled of claim 1, wherein the sharp corner is configured to dig into the ground to pivot the bale sled in an upright position to load the round bale in the bale holding portion.

4. The bale sled of claim 1, wherein the round corner allows for the bale sled to slide along the ground.

5. The bale sled of claim 1, further comprising:
a loading strap configured to strap a round bale to the bale holding portion of the bale sled when the bale sled is placed over the round bale.

6. The bale sled of claim 1, further comprising:
at least one attaching point.

7. A bale sled comprising:
a bale holding portion to hold a round bale, the bale holding portion having a width and a length, the width of the bale holding portion extending between opposing ends of at least one semi-circular bale support of a plurality of semi-circular bale supports that are conformed to the shape of a portion of the round bale;
at least two base rails coupled to the bale holding portion, the at least two base rails configured and arranged to space the bale holding portion a select distance from a ground the bale sled is resting on when the bale sled is in an upright position so that a round bale received in the bale holding portion is spaced the select distance from the ground when the bale sled is in the upright position, each base rail including,
a bottom portion having a length that extends between a first end and second end, the bottom portion configured to engage a ground, the bottom portion further arranged and configured so that the length of the bottom portion extends along a direction of the width of the bale holding portion;
a first portion having a first end and a second end, the first end of the first portion coupled to the bale holding portion,
a rounded corner between the second end of the first portion and the second end of the bottom portion,
a second portion having a first end and a second end, the first end of the second portion coupled to the bale holding portion, and
a sharp corner between the second end of the second portion and the first end of the bottom portion.

8. The bale sled of claim 7, wherein the bale holding portion further comprising:
a forward retaining rail;
a rear retaining rail; and
the plurality of bale supports coupled between the forward retaining rail and the rear retaining rail, each bale support having a semi-circle shape.

9. The bale sled of claim 8, wherein the plurality of bale supports are spaced a select distance apart from each other to prevent an animal from getting stuck in the bale sled.

10. The bale sled of claim 8, further comprising:
a first side retaining rail coupled between the forward retaining rail and the rear retaining rail along a first side of the bale sled;
a second side retaining rail coupled between the forward retaining rail and the rear retaining rail along a second side of the bale sled; and
at least one U-shaped side support extending between the first side retaining rail and the second side retaining rail, the at least one side support coupled to each of the bale supports.

11. The bale sled of claim 10, wherein the first side retaining rail, second side retaining rail, forward retaining rail and rear retaining rail form an outer parameter, the at least two base rails received within planes formed by the outer parameter.

12. The bale sled of claim 10, further comprising:
a first attaching rod coupled across the first side retaining rail and the forward retaining rail; and
a second attaching rod coupled across the second side retaining rail and the forward retaining rail.

13. The bale sled of claim 12, further comprising:
a third attachment rod coupled to a mid portion of the rear retaining rail.

14. The bale sled of claim 7, wherein each base rail further comprises:
at least one base support coupled between the bottom portion and the bale holding portion.

15. The bale sled of claim 7, wherein the bottom portion of each base rail has a length that is shorter than the width of the base holding portion.

* * * * *